Nov. 27, 1962  J. WENZL  3,065,766

SURGE ABSORBER

Filed Jan. 3, 1958

Inventor:
JOSEF WENZL

United States Patent Office 3,065,766
Patented Nov. 27, 1962

3,065,766
SURGE ABSORBER
Josef Wenzl, Braunschweig, Germany, assignor to Firma Walter Jordan G.m.b.H., Braunschweig, Germany, a firm of Germany
Filed Jan. 3, 1958, Ser. No. 707,028
Claims priority, application Germany July 15, 1957
2 Claims. (Cl. 138—30)

The present invention relates to surge absorbers and similar apparatus, particularly for pressure lines.

In order to level off or reduce the impacts in pipe lines which are caused by sudden changes in pressure therein and which often amount to a multiple of the normal operating pressure, it has for some time been a common practice to insert a surge-absorbing device into the pressure system. This applies, for example, to the pipe and hose lines on fuel tanks where such pressure surges occur during the filling and refilling operations. Such surge-absorbing device usually consists of a cylindrical compensating chamber which is separated from the pressure line by a tubular partition of resilient material which is gastight and fluidtight and subjected to an adjustable counterpressure.

However, it has been found that the durability of the resilient partition of such a surge absorber depends not only upon the strength of the pressure impacts acting thereon but at least to the same extent upon the resistance of the resilient material against fatigue under the frequent expansion and contraction thereof.

It is an object of the present invention to provide a surge absorber or similar apparatus as above described with suitable means for protecting the material of the resilient partition of such apparatus from fatigue due to frequent expansion thereof.

The present invention is applicable particularly to a surge-absorbing chamber or similar apparatus which may be connected to a pressure line either as an in-line chamber or as a T or dead-end chamber, and in which the compensating chamber, the resilient partition, and advantageously also a perforated inner wall member supporting the latter are mounted concentrically within one another. The above-mentioned object of the present invention may be attained in an apparatus of this kind by making the resilient partition of a substantially wavy, corrugated or scalloped cross-sectional shape. According to a preferred embodiment of the invention, the corrugations of this partition normally project into the compensating chamber by virtue of the resiliency of the material, and each corrugation forms a loop with a constricted mouth portion defining a narrow longitudinal gap adjacent to the perforated wall so that the portions intermediate the corrugations will form a substantially continuous cylindrical member or tube which normally engages the outer surface of the perforated wall.

Further objects, features, and advantages of the present invention will be apparent from the following detailed description thereof, particularly when read with reference to the accompanying drawing in which:

FIG. 2 shows at the left side an end view and at the right side a cross section of the surge absorber illustrated in FIG. 1; while

Figure 1:
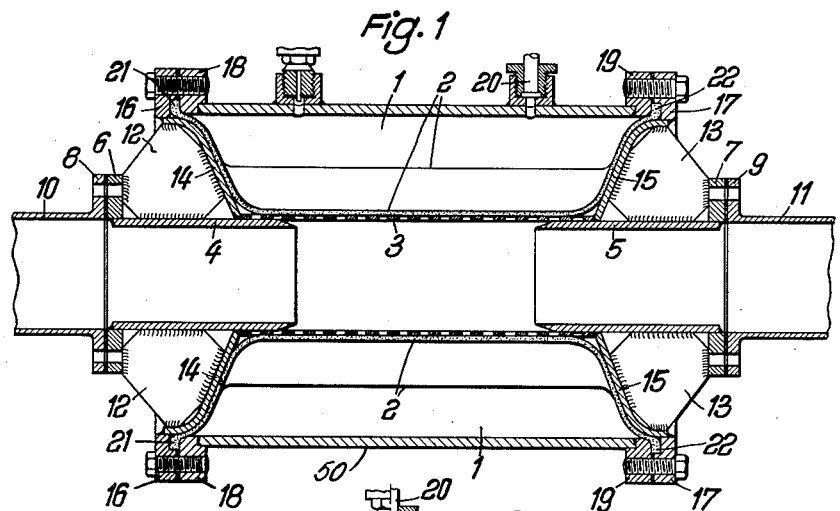
FIG. 1 shows a vertical longitudinal section of the new surge absorber.

As shown in the drawing, the surge absorber according to the invention essentially consists of tubular concentrical elements forming a compensating chamber 1, and including a resilient partition 2, a perforated member 3 for supporting the partition 2, and an outer cylindrical member 50. In the particular embodiment illustrated, the perforated tubular supporting member 3 is slipped over the inner ends of two pipe sockets 4 and 5 which are provided with flanges 6 and 7 at their outer ends for connecting the same to similar flanges 8 and 9 of pipe lines 10 and 11. The peripheral wall of each socket 4 and 5 carries a plurality of radially extending fins 12 or 13, respectively, which are welded thereon and are connected to each other by a frusto-conical wall 14 or 15, respectively, the inner edge of which may also be welded to socket 4 or 5, respectively. The outer edges of the conical wall portions 14 and 15 carry flanges 16 and 17, which are secured to flanges 18 and 19 of the outer cylindrical member 50 which forms the compensating chamber 1. The latter is connected to a pipe line 20, through which a suitable pressure medium is supplied into compensating chamber 1 for producing a counter-pressure therein, and may also be provided with a suitable pressure gauge or similar control means.

The resilient partition 2 is shaped so that, in its related position, its two ends will engage the conical wall portions 14 and 15, while its outer edges form sealing rings 21 and 22 which are interposed between flanges 16, 18 and 17, 19, respectively, on the outer cylindrical member 50 and the frusto-conical wall portions 14 and 15.

Figure 2:
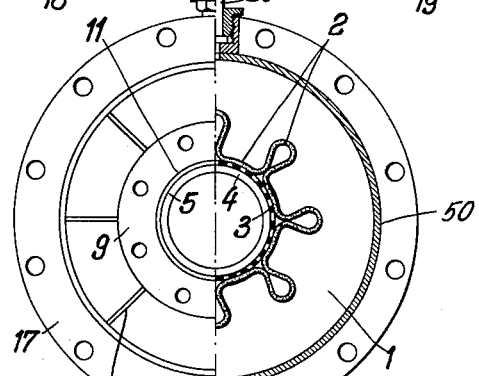
Figure 3:
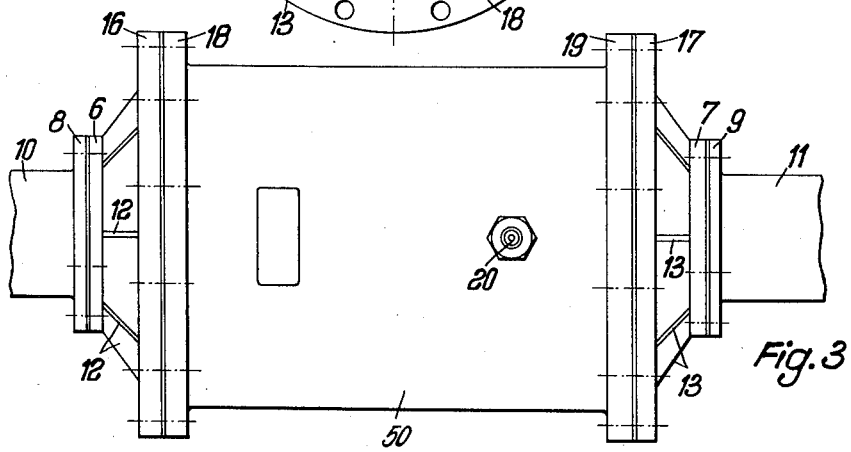
FIG. 3 shows a side view of the new surge absorber.

The entire central portion of the resilient partition 2 normally rests upon the perforated tubular member 3 and is of a circumferentially scalloped shape, as illustrated particularly in FIG. 2, so that, when there is a pressure balance between the interiors of compensating chamber 1 and of member 3, each corrugation forms a loop with a substantially closed mouth portion adjacent to member 3, and the portions intermediate the loops together form a substantially closed cylinder or tube which closely engages the outer surface of the perforated tubular member 3. It will be noted that the loops of sleeve 2 in their erect positions form longitudinal ridges constituting generatrices of an imaginary cylinder, tangent to these loops, and that their junctions with the outwardly flared end portions supported by walls 14 and 15 lie in an annular zone whose outer radius is slightly larger than that of the imaginary cylinder referred to.

If a surge of pressure occurs in pipe line 10, 11, the resilient partition 2 will be lifted from the perforated member 3. The impact of such pressure surge will act primarily upon the flat tube segments between the loops thereof and will only flatten out the corrugations to some extent. Under normal operating conditions, the resilient material of partition 2 will therefore not be extended or unduly strained and will therefore last longer and serve its surge-absorbing function longer than the rubber sleeves which were provided in previous apparatus of this kind.

As already indicated, the surge absorber according to the invention may be inserted into a pipe line, as illustrated in the drawing so that the pressure medium in which pressure surges are to be expected flows through the surge absorber; or only one end thereof may be connected to such pipe line or to a dead end thereof, while the other end of the surge absorber is closed.

Although my invention has been illustrated and described with reference to a preferred embodiment thereof, I wish to have it understood that it is in no way limited to the details of such embodiment, but is capable of numerous modifications within the scope of the appended claims.

Having thus fully disclosed my invention, I claim:

1. In a surge-absorbing apparatus for use with a conduit carrying a fluid under variable pressure, in combination, a perforated inner elongated tubular member connectable at least at one end to said conduit, an elongated casing member coaxially surrounding said inner tubular member and spaced therefrom with annular clearance, and a circumferentially scalloped resilient sleeve surrounding said inner tubular member and forming with said casing member a surge-damping compensating chamber around said inner tubular member, said sleeve having a central portion bearing yieldably on said inner tubular member and outwardly extending end portions adjoining said central portion, the respective extremities of said members being formed with co-operating annular flanges extending radially outwardly from said inner tubular member and sealingly engaging said end portions of said sleeve therebetween, the scallops of said sleeve being hollow and resilient and forming flattenable, circumferentially spaced loops extending longitudinally along said central portions and projecting into said chamber while spanning said end portions along an annular zone whose outer radius is at least equal to that of an imaginary cylindrical surface tangent to said loops.

2. In a surge-absorbing apparatus for use with a conduit carrying a fluid under variable pressure, in combination, a perforated inner elongated tubular member connectable at least at one end to said conduit, an elongated casing member coaxially surrounding said inner tubular member and spaced therefrom with annular clearance, and a circumferentially scalloped resilient sleeve surrounding said inner tubular member and forming with said casing member a surge-damping compensating chamber around said inner tubular member, said sleeve having a central portion bearing yieldably on said inner tubular member and outwardly extending end portions adjoining said central portion, the respective extremities of said members being formed with co-operating annular flanges extending radially outwardly from said inner tubular member and sealingly engaging said end portions of said sleeve therebetween, the scallops of said sleeve being hollow and resilient and forming flattenable, circumferentially spaced loops extending longitudinally along said central portion and projecting into said chamber while spanning said end portions, said central portion having a substantially continuous cylindrical inner surface interrupted by small peripherally spaced longitudinal gaps forming constricted mouth portions of respective loops, said cylindrical surface hugging said inner tubular member upon the pressure therein substantially equaling the pressure in said chamber.

References Cited in the file of this patent

UNITED STATES PATENTS

| | | |
|---|---|---|
| 2,278,688 | Caminez | Apr. 7, 1942 |
| 2,343,320 | Parker | Mar. 7, 1944 |
| 2,609,001 | Hebard | Sept. 2, 1952 |
| 2,760,518 | Peet | Aug. 28, 1956 |
| 2,841,181 | Hewitt | July 1, 1958 |
| 2,875,787 | Evans | Mar. 3, 1959 |
| 2,878,835 | Peterson | Mar. 24, 1959 |